United States Patent
Castillo et al.

(10) Patent No.: US 12,556,969 B2
(45) Date of Patent: Feb. 17, 2026

(54) LOCALLY DISPERSED OBJECT STORAGE IN 5G RADIO ACCESS NODES

(71) Applicant: INTERNATIONAL BUSINESS MACHINES CORPORATION, Armonk, NY (US)

(72) Inventors: Alfredo R Castillo, Chicago, IL (US); Akila Srinivasan, Carpentersville, IL (US)

(73) Assignee: International Business Machines Corporation, Armonk, NY (US)

( * ) Notice: Subject to any disclaimer, the term of this patent is extended or adjusted under 35 U.S.C. 154(b) by 612 days.

(21) Appl. No.: 17/955,872

(22) Filed: Sep. 29, 2022

(65) Prior Publication Data
US 2024/0114389 A1 Apr. 4, 2024

(51) Int. Cl.
*H04W 28/08* (2023.01)
*H04W 28/086* (2023.01)

(52) U.S. Cl.
CPC ... *H04W 28/0861* (2023.05); *H04W 28/0867* (2020.05)

(58) Field of Classification Search
CPC .................. H04W 28/0861; H04W 28/0867
See application file for complete search history.

(56) References Cited

U.S. PATENT DOCUMENTS

| 8,274,900 | B2 | 9/2012 | Yi et al. |
| 9,699,800 | B2 | 7/2017 | Himayat |
| 10,498,659 | B2 | 12/2019 | Bull |
| 10,536,946 | B2 | 1/2020 | Zhu |
| 2021/0334040 | A1* | 10/2021 | Borich .................. G06F 3/0659 |

FOREIGN PATENT DOCUMENTS

CN 113507729 A 10/2021

OTHER PUBLICATIONS

"3G PP A Global Initiative", 5G, 2 pps., The Mobile Broadband Standard, © 3GPP 2022, <https://www.3gpp.org/>.

* cited by examiner

*Primary Examiner* — Ronald B Abelson
(74) *Attorney, Agent, or Firm* — Anthony Curro

(57) ABSTRACT

The method provides for one or more processors to disperse object data for storage within a fifth-generation radio access network (RAN). The one or more processors receive radio frequency (RF) input for object data storage from a client device. The one or more processors perform a setup session configuring the RF input received for object data storage. The one or more processors perform a translation of the received RF input, wherein the translation enables processing of the RF input by an information dispersal algorithm (IDA) and enables storage of the object data of the RF input among multiple next generation node base stations (gNBs) forming a gNB cluster within a radio access network (RAN), and the one or more processors storing the object data of the received RF input across the gNB cluster in an Object Segment format.

20 Claims, 4 Drawing Sheets

LOCALLY DISPERSED OBJECT STORAGE IN 5G RADIO ACCESS NODES

BACKGROUND

The present invention relates to a telecommunications open-radio access network (O-RAN), and more specifically to an architecture enabling dispersed object storage within disaggregated elements of the O-RAN.

Next generation radio access network systems using open-radio access network architecture face challenging performance and service standards. The $3^{rd}$ Generation Partnership Project (3GPP) unites national Standards Development Organizations from around the globe developing technical specifications for the $3^{rd}$ generation of mobile, cellular telecommunications that include greater uplinks and downline rates for indoor hotspot environments and rural macro environments. Cloud service requirements support performance of computations in the network rather than on a user's equipment (UE), which requires a high data rate in the uplink and very low round trip latency. The increased standards requirements may result in greater backhaul traffic conditions that link the mobile access network to the core network.

SUMMARY

According to an embodiment of the present invention, a computer-implemented method, computer program product, and computer system are provided. The method provides for one or more processors to disperse object data for local storage within a radio access network (RAN). The one or more processors receive radio frequency (RF) input for object data storage from a client device. The one or more processors perform a setup session configuring the RF input received for object data storage. The RF input is processed by RF receivers and a baseband processor on the gNB. The invention provides a PDCP-S3 storage translation function that enables storage of user content by converting PDCP frames to object data and generating a request for processing by an information dispersal algorithm to disperse redundant slices into local storage units of the gNB cluster.

DETAILED DESCRIPTION

Figure 1:
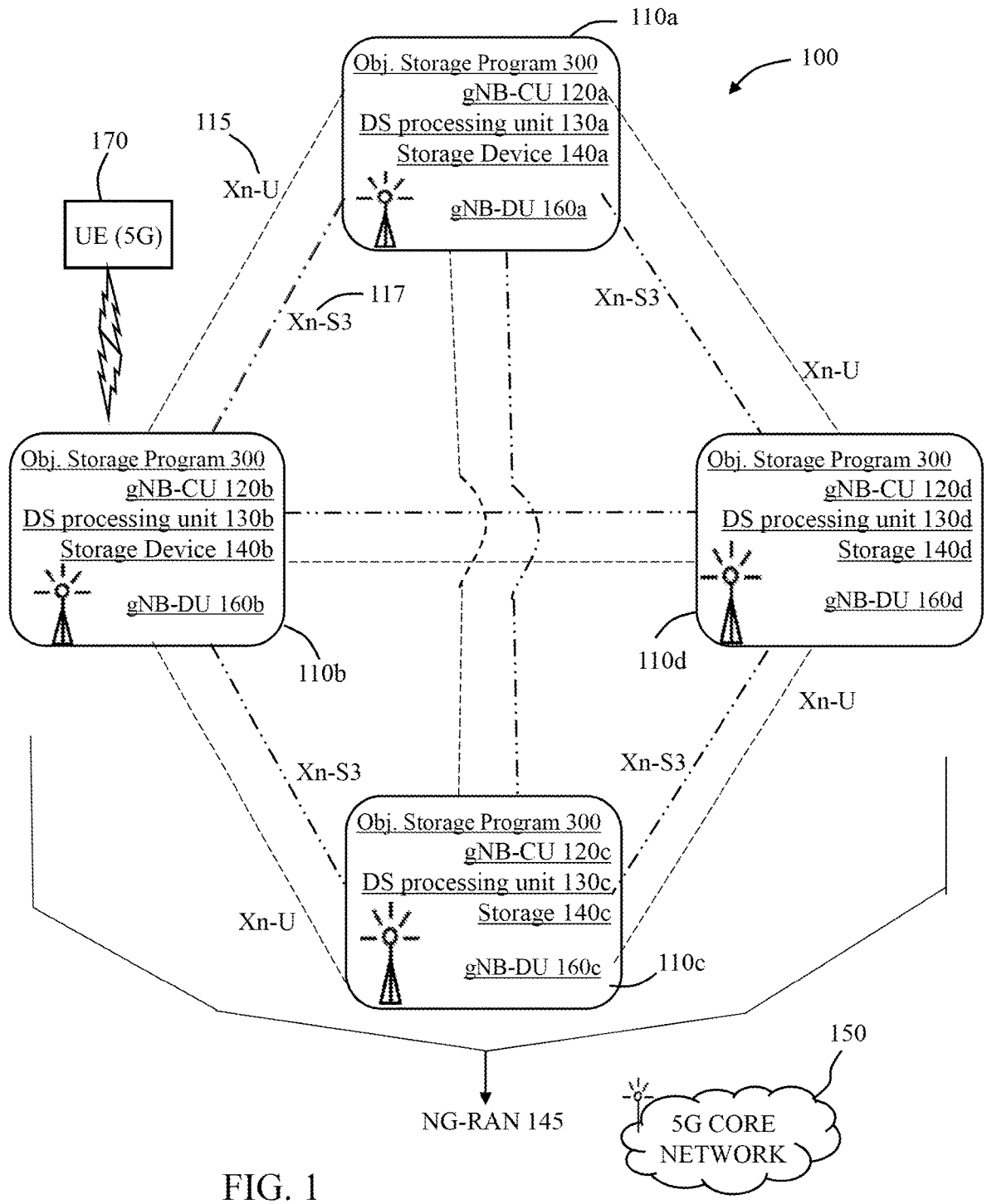
FIG. 1 is a functional block diagram illustrating a distributed data processing environment, in accordance with an embodiment of the present invention.

Embodiments of the present invention recognize that 5G Radio Access Network (RAN) requirements may increase demands on backhaul uplink and download bandwidth, which may require additional infrastructure upgrades to achieve 5G performance expectations. Cloud service requirements support cloud applications to perform computations and functions in the network rather than on user devices (i.e., user equipment, EU). Backhaul bandwidth utilization to meet 5G requirements will be significant and may impact costs as well as cause potential bottlenecks in achieving uplink/downlink throughputs and latency targets. Embodiments also recognize that cloud object storage extends storage capabilities of computing devices and may disperse storage of objects utilizing multiple resources across multiple locations.

Embodiments recognize that a 5G network architecture includes a "new generation radio access network" component (NG-RAN, sometimes referred to as O-RAN; Open-Radio Access Network) and a 5G Core component. The NG-RAN contains new generation node base stations (gNB) units, sometimes referred to as 5G base stations, and new generation extended node B (ng-eNB) units, sometimes referred to as LTE base stations. NG-C interfaces connect the gNB and ng-eNB unit control plane information from the NG-RAN to the 5G core network, and the NG-U interfaces connect user plane information between gNB and ng-eNB units and the 5G core network. The gNBs and/or ng-eNBs are responsible for all radio-related functions in one or several cells, for example radio resource management, admission control, connection establishment, routing of user-plane data to the UPF and control-plane information to the Access and Mobility Management Function (AMF), and quality-of-service (QoS) flow management. The gNB and ng-eNB units interconnect in the NG-RAN via Xn linkages providing user plane interface and control plane interface. Additionally, embodiments recognize that the 5G new radio (NR) gNB is connected to an AMF and User Plane Function (UPF) operating in the 5G Core Network.

Embodiments of the present invention provide dispersed object storage locally within the RAN utilizing local storage elements embedded in next generation node B centralized unit (gNB-CU) components of an Open-Radio Access Network (O-RAN). Embodiments of the present invention provide details and examples directed to a 5G radio access network for clarity but are not limited to 5G technology networks.

Aspects of the invention include leveraging the split between the Centralized Unit (CU) and the Distributed Unit (DU) components of gNBs within the O-RAN architecture. Objects to be stored are transferred via the User Data Plane, which has lower latency requirements than the Control Plane. User equipment (UE) transmits object data to be stored to a gNB-DU component of a next generation node base station. The gNB-DU delivers the received object data to the corresponding gNB-CU component by a connection interface, often referred to as an F1 interface connection. The gNB-CU includes virtualized network functionality that recognizes the received input as requiring local object storage. The object data is delivered as Packet Data Coverage Protocol (PDCP) frames and translated to enable S3 storage and processing by an information dispersal algorithm (IDA) to disperse slice segments of the object data into storage devices (i.e., buckets) embedded within the Centralized Units (CU) of next generation Node B (gNB) nodes. The IDA represents an error coding function such as Reed-Solomon, RAID 5, RAID 6, or other forward error correcting codes or erasure codes, and embodiments of the present invention are not limited by the type of error coding function used. The CU component provides support for the higher layers of the protocol stack such as SDAP, PDCP and RRC while the DU provides support for the lower layers of the protocol stack such as RLC, MAC and Physical layer (discussed in more detail with respect to FIG. 2). The PDCP frames are translated to be compatible with storage APIs, such as an S3 format, enabling local storage of data objects within the RAN, and reducing use of backhaul utilization to the 5G network core and cloud environments.

Embodiments of the present invention provide a new Radio Configuration of received object storage calls from user equipment (UE) with a PDCP-S3 translation enabling object data frames to be processed by an information dispersal algorithm (IDA). The PDCP-S3 translation addresses the data-packet-PDCP-to-storage payload translation, enabling local storage in storage devices embedded within a cluster of disaggregated O-RAN nodes. In embodiments of the present invention, user equipment (UE) can directly upload data to the radio access network dispersed cloud storage layer by establishing a new radio configuration that defines storage of the object data using O-RAN protocols that perform a PUT operation transparently to the UE.

Aspects of the present invention include a new radio configuration initiated at call setup upon receipt of input from UE, and a PDCP-S3 storage translation function that enables storage by formatting of object data frames in response to an S3 request and forwarding the request for processing by an IDA operating on a distributed storage processing unit (ds processing unit), to disperse redundant slices into local storage units of the gNB cluster. Aspects of the invention also include local storage time limits, predetermined and configurable policies that may delete object data stored locally subsequent to a time limit, or may upload the object data via backhaul operations to cloud storage during low demand periods. Aspects of the invention reduce backhaul demand, relieve bandwidth utilization, provide improved latency of data storage and data access, and provide object data protection, reproducibility, and security. Embodiments of the present invention include a read/write threshold of available gNB's within the cluster, which enables performance in light of degraded radio channel conditions or gNB outage.

In embodiments of the present invention, a new protocol added to the PDCP layer enables the gNB-CU to write data to co-located storage devices, as opposed to sending it over the backhaul to the 5G Core Network for storage in cloud resources. The embodiments have advantages of decreased backhaul bandwidth while increasing the availability and affecting latency of the data. The local storage system can be configured to delete the data after a pre-configured time-period has elapsed or offload the data to a dedicated storage such as in the cloud for later processing during a low demand time period. The proposed storage system includes initiating the slicing and redundancy of data to multiple storage devices within a gNB cluster such that the loss of one or more gNBs in the system will not lead to loss of data access. Embodiments propose a method, system, and computer program product for storage of object data locally and preserving backhaul bandwidth.

Embodiments make use of Cloud Object Storage, with its ability to store slices and then recombine the slices to retrieve the original data, in conjunction with storage of object data on storage devices included within gNBs to provide local storage for UE data and have this data available to the UE even if the UE fades away from its serving gNB or otherwise loses its serving gNB. Embodiments accomplish the local storage of object data from UE input by performing a translation of the packet data frames processed by the gNB-CU, converting the packet data frames into S3 interface object data frames. The proposed storage system includes the slice segmentation of object data to multiple storage devices, such that the loss of one or more gNBs in the system will not lead to loss of data access.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes NG-RAN 145 and 5G Core Network 150. NG-RAN 145 includes new generation node base station units (gNB units) 110a, 110b, 110c, and 110d, which comprise the example NG-RAN network depicted in FIG. 1. 5G Core Network 150 provides connections from NG-RAN gNB units 110a, 110b, 110c, and 110d of NG-RAN 145 to the Internet and other networks and services such as cloud services and cloud object storage. Distributed data processing environment 100 also includes interfaces Xn-U 115 and Xn-S3 117.

5G Core Network 150 includes an Access and Mobility Management Function (AMF) and User Plane Function (UPF) in 5G Core Network 150 (not shown), that connects gNB units 110a, 110b, 110c, and 110d of NG-RAN 145 to 5G Core Network 150. NG-RAN 145 includes gNB 110a, 110b, 110c, and 110d units, which access 5G Core Network 150 via NG interfaces (not shown). NG-RAN 145 includes multiple gNB units that are interconnected via Xn-U 115 interfaces and comprise the next generation-radio access network. NG-RAN 145 processes transmissions to and from 5G user equipment (UE) 170.

Aspects of the present invention include Xn-U 115, which provides a User Plane interface interconnecting NG-RAN nodes, such as gNB units 110a, 110b, 110c, and 110d. Aspects of the invention also include Xn-U 115, which handles User Plane Functions of data forwarding and flow control, among others. Embodiments of the present invention include Xn-S3 117 interfaces, providing storage delivery interconnected between gNB units 110a, 110b, 110c, and 110d. Xn-S3 117 interfaces provide connections enabling the dispersal of object data slices to storage devices included in gNB control units (gNB-CU 120a, 120b, 120c, and 120d) by object storage program 300 acting in conjunction with ds processing unit 260. The ds processing unit is a device connected to a gNB and subsequent to a translation of the object data to an S3 format, the ds processing unit, working with the IDA, performs the slicing and duplication of the S3 formatted object data to store, and distributes the slices of object data to storage units of the gNBs of the cluster.

NG-RAN 145 (NG-RAN is a generic term for Next Generation RAN; O-RAN may be applicable in embodiments of the present invention. The term "O-RAN" is in reference to the Open Radio Network Alliance), includes next generation node base station (gNB) 110a as a node within a cluster of next generation nodes. The respective gNBs perform radio-related functions in one or more cells or clusters, such as resource management, admission control, connection establishment, routing of user-plane data, and control-plan information to the AMF, and quality-of-service (QoS) flow management. In one embodiment, gNB 110a includes object storage program 300, gNB-CU 120a, ds processing unit 130a, storage device 140a, and gNB-DU 160a. Each gNB-CU (Centralized Unit) has a corresponding gNB-DU (Distribution Unit) and the split between the CU and DU enables the gNB-CU to provide support for the higher layers of the protocol stack, while the gNB-DU provides support for the lower layers of the protocol stack. Embodiments of the present invention leverage the split between the Central Unit and Distribution Unit of respective gNB units to enable localized cloud object storage on a cluster of gNB units, such as gNB 110a, 110b, 110c, and 110d of NG-RAN 145. Embodiments recognize that gNBs 110b, 110c, and 110d of FIG. 1 include components similar to those of gNB 110a discussed above. In some embodiments, gNB 110a, 110b, 110c, and 110d of NG-RAN 145 may include internal and external hardware components, depicted in more detail in FIG. 4.

In embodiments of the present invention, next generation node base station-centralized unit (gNB-CU) 120a of gNB 110a includes a Packet Data Coverage Protocol (PDCP) that receives transferred object data to be stored from the User Data Plane and initiates S3 translation of object data packet frames by an object segment translator in the PDCP layer, which enables storage of the object data on locally added object storage S3 "buckets" embedded within the cluster of gNBs or optionally remotely connected to the cluster of gNBs. The translation includes an API call that includes certain headers for the PDCP frames making them compatible with S3 storage and processing by an information dispersal algorithm. The PDCP is a component of the higher layer protocol stack associated with gNB-CU 120a. The object segment translation enables processing of the PDCP frames by an information dispersal algorithm (IDA) in which segment slices of the translated frames are dispersed among the gNB cluster of NG-RAN 145, such as dispersed across gNBs 110a, 110b, 110c, and 110d.

In some embodiments, gNB-CU 120a recognizes a new radio configuration mode associated with radio frequency (RF) input received from UE 170 that includes requested object data storage. The radio configuration is negotiated during the call setup session, recognizing what the input is (i.e., object storage) and what resources and formatting are needed, as provided by the configuration information for the new mode. The PDCP object segment translation is performed in a virtualized network function within the open radio access network (O-RAN). In one embodiment, gNB-CU 120a includes ds processing unit 130a and storage device 140a. In another embodiment, storage device 140a may be remote and communicatively connected to gNB-CU 120a. In yet another embodiment, storage device 140a may be embedded within or connected to some of the nodes of the gNB cluster of NG-RAN 145. Embodiments of the present invention recognize that the description and configuration of gNB-CU 120a is similar to and representative of gNB-CUs 120b, 120c, and 120d depicted in FIG. 1.

The component gNB-DU 160a of gNB 110a is associated with the lower layers of the protocol stack and receives and transmits radio frequency calls from UE 170. Embodiments recognize that gNB-DU 160a is similar to, and representative of gNB-DUs 160b, 160c, and 160d, as depicted in FIG. 1.

Ds processing unit 130a performs slicing of the received data object into segments that are determined based on the defined or default IDA width. Ds processing unit 130a includes virtualized network functions providing computational capabilities and works in conjunction with an information dispersal algorithm (IDA) to determine the size and number of slices of the object data to be distributed and stored. Embodiments of the present invention propose a change to the end point of the tunneling protocol (PDCP-GPRS Tunneling Protocol to Packet Data Network Gate Way) to a virtual ds processing unit application co-located in gNB-CUs. Embodiments recognize that ds processing unit 130a works in association with gNB-CU 120a and is representative of ds processing unit 130b, 130c, and 130d.

In some embodiments, the ds processing units 130a, 130b, 130c, and 130d, disperse the sliced blocks of the object data among storage devices (i.e., storage devices 140a, 140b, 140c, and 140d) of the gNBs of NG-RAN 145. In some embodiments, the IDA determines a redundancy of segment slices of the object data dispersed among the storage devices, embedded or connected to respective gNB-CUs of the gNB cluster. The IDA determines the slicing and redundancy of object data, and ds processing unit 130a performs slicing of the object data and utilizes the Xn-S3 internal communication interface links for dispersal of object data slices among storage devices associated with gNB-CUs of the gNB cluster. The number of gNBs can be used to define the IDA width within the cluster and the IDA selected may result in redundancy of slices dispersed among the gNB-CUs, thus enabling read/write operations despite availability issues and/or radio channel conditions degrading the radio link quality, as long as a threshold number of gNBs of the cluster remain available. In some embodiments, the ds processing unit and its components can be external to the gNB, which enables the IDA read/write operations to be met with gNB availability below the threshold. The IDA establishes threshold numbers for read operations and threshold numbers for write operations. It is noted that the IDA width can be greater than or less than the number of gNBs in the cluster, varying based on the reliability and availability requirements.

In some embodiments, storage device 140a receives and stores slices of the data object to be stored as a component of gNB 110a. The slices of the object data to be stored are distributed across multiple nodes of the gNB cluster and may include redundant slices respectively stored on multiple storage devices embedded in respective gNBs of the radio access network cluster.

In an embodiment of the present invention, object storage program 300 operates as a component program or module of respective next generation node base station-central units (gNB-CU) of a next generation radio access network (NG-RAN) of a 5G new radio (NR) network architecture. Object storage program 300 provides a PDCP layer object segment translation of received object storage data enabling object data processing by an IDA operating on the ds processing unit 260 in conjunction with object storage program 300. Object storage program 300 receives cloud storage virtualization functionality within the gNBs of a cluster of nodes of the radio access network. Object storage program 300 receives input of object data for storage from user equipment (UE) via the gNB-DU component of a next generation node base station of the cluster of nodes of the radio access network. In some embodiments, the received input includes a new radio configuration, recognized by the PDCP layer that triggers object storage program 300 for translation and local storage of the object data. Object storage program 300 performs a translation of the received object data to an object segment format that can be processed by an information dispersal algorithm (IDA). The translation performed by object storage program 300 includes frame header changes to enable the processing by the IDA and S3 storage but does not alter the content.

In one embodiment, having performed a translation of the object data, object storage program 300 outputs to a virtual ds processing unit application working in conjunction with or as a module of object storage program 300. The virtual ds processing unit application, such as ds processing unit 130a, initiated by object storage program 300, slices the translated object data for storage into data blocks and utilizes the IDA, dispersing the data block slices to storage devices embedded in (or remotely connected to) gNB-CU components of the gNBs of the next generation radio access network. Based on the number of gNBs and storage devices determined during setup of the gNB cluster, the IDA defines the read and write thresholds to be used in operation of the gNBs of the cluster. The write thresholds determine the level of dispersal of redundant block slices of the object data and, in some embodiments, can be a multiple of the number of available gNBs to successfully complete read and/or write operations should degraded conditions occur within the gNB cluster.

Figure 2:
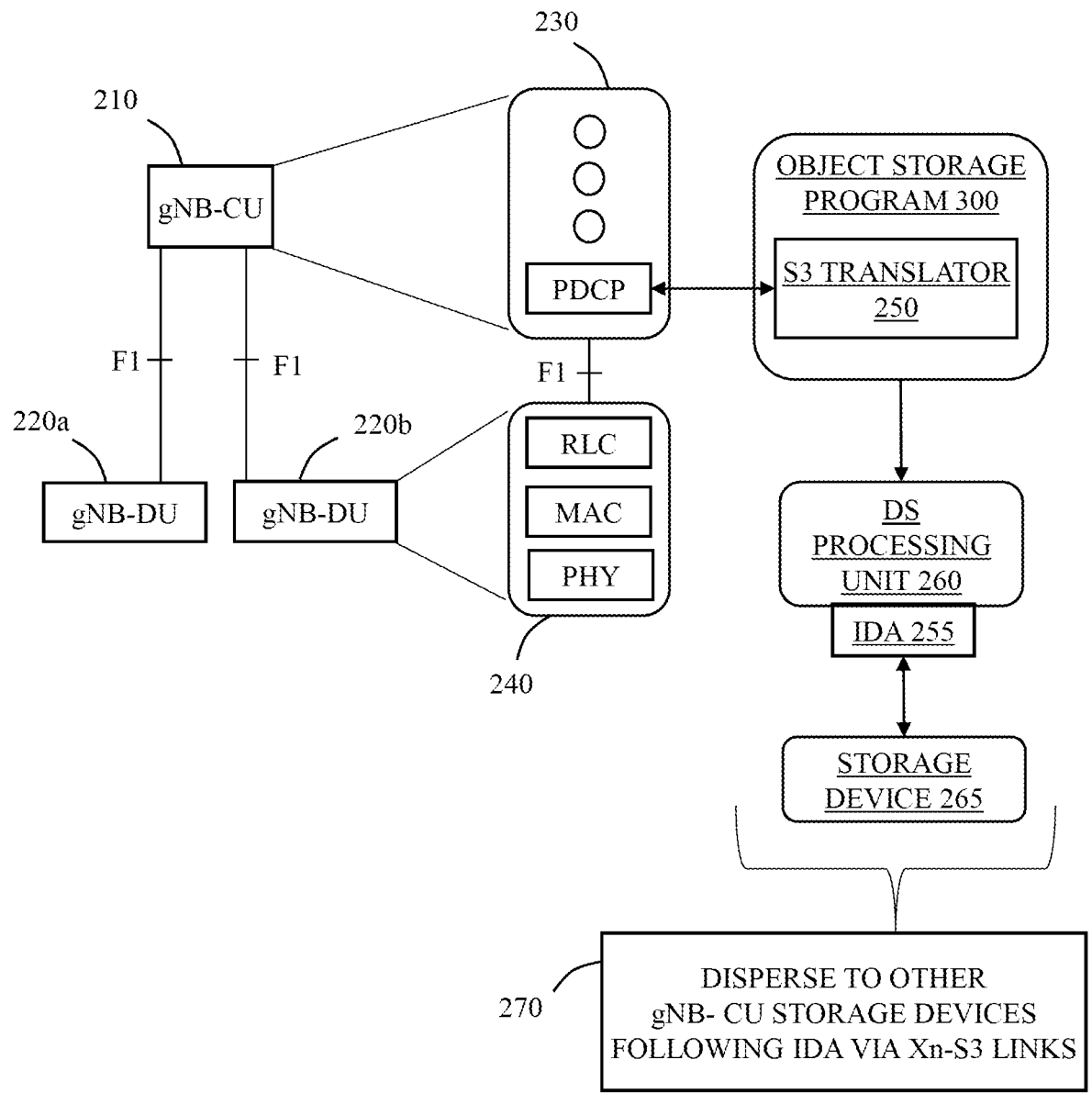
FIG. 2 depicts a gNB component alignment with a protocol stack and additional virtualized network functions, in accordance with embodiments of the present invention.

FIG. 2 depicts alignment of components of a next generation node base station of an O-RAN and alignment with a protocol stack with additional virtualized network functions, in accordance with embodiments of the present invention. FIG. 2 includes gNB-Cu 210, gNB-DU 220a and gNB-DU 220b, split protocol stack upper layer 230 and lower layer 240, S3 translator 250, object storage program 300, ds processing unit 260, and storage device 265. Upper protocol layer 230 is aligned with and is supported by gNB-CU 210, which is depicted as communicating with gNB-DU 220a and gNB-DU 220b via interface F1. In an embodiment, gNB-CU 210 includes object storage program 300, which further includes S3 translator 250. In an embodiment, gNB-CU 210 connects to a ds processing unit, which receives input from object storage program 300. The ds processing unit utilizes IDA 255, defined during configuration of the storage system, to determine a width of the gNB cluster and slice and disperse the received object data for localized cloud storage within the RAN cluster of gNBs. In another embodiment, object storage program 300, which includes the S3 translator, can be an external or virtualize component, which will require an interface between the PDCP and S3 translator. Object storage program 300 translates the RF frames to S3 object storage format data and sends the data to the ds processing unit, requesting slicing, dispersal and storage of the data, based on the IDA.

Upper protocol layer 230 includes the Packet Data Coverage Protocol (PDCP) and gNB-DU 220b is depicted as aligned with and supporting the lower protocol layer 240. Embodiments of the present invention have enhanced the PDCP component of the upper protocol layer to receive and recognize a new radio configuration of input from gNB-DU 220a or gNB-DU 220b originating from user equipment (UE). The new radio configuration is recognized by PDCP for local storage of object data and forwards the input for translation by S3 translator 250 of object storage program 300. The S3 translated object data is compatible for processing by IDA 255, which can be a multiple of the gNB cluster width, and threshold gNB units for read/write reliability and security. The S3 translated object data is sliced (i.e., segmented) by ds processing unit 260, considering the IDA determined width, redundancy. The sliced object data is dispersed to the storage devices associated with the gNBs of the RAN cluster and stored locally in the storage devices, such as storage device 265, which are embedded or connected to the gNB-CU components of the eNBs of the RAN, such as gNB-CU 210.

In some embodiments, IDA 255 and ds processing unit 260, working in conjunction with object storage program 300, disperse redundant segments of the object data among eNBs using Xn-S3 interface links connecting gNBs of the RAN cluster. Embodiments of the present invention recognize the architecture changes that output GPRS tunneling protocol from the UE to gNB-DU 220b, for example, and using the F1 interface, forward the received input to gNB-CU 210. The new radio configuration associated with the UE input is recognized by gNB-CU 210 for local object data storage. The New Radio configuration determines and defines the need for PDCP-S3 translation and how the translation is performed by the S3 translator function, enabling the input data to be stored in local storage devices. The PDCP layer sends and receives packet data frames to the S3 translator, object storage program 300. The translated data is then forwarded to ds processing unit 260, and dispersed to local storage, such as storage device 265 without requiring backhaul processing.

Figure 3:
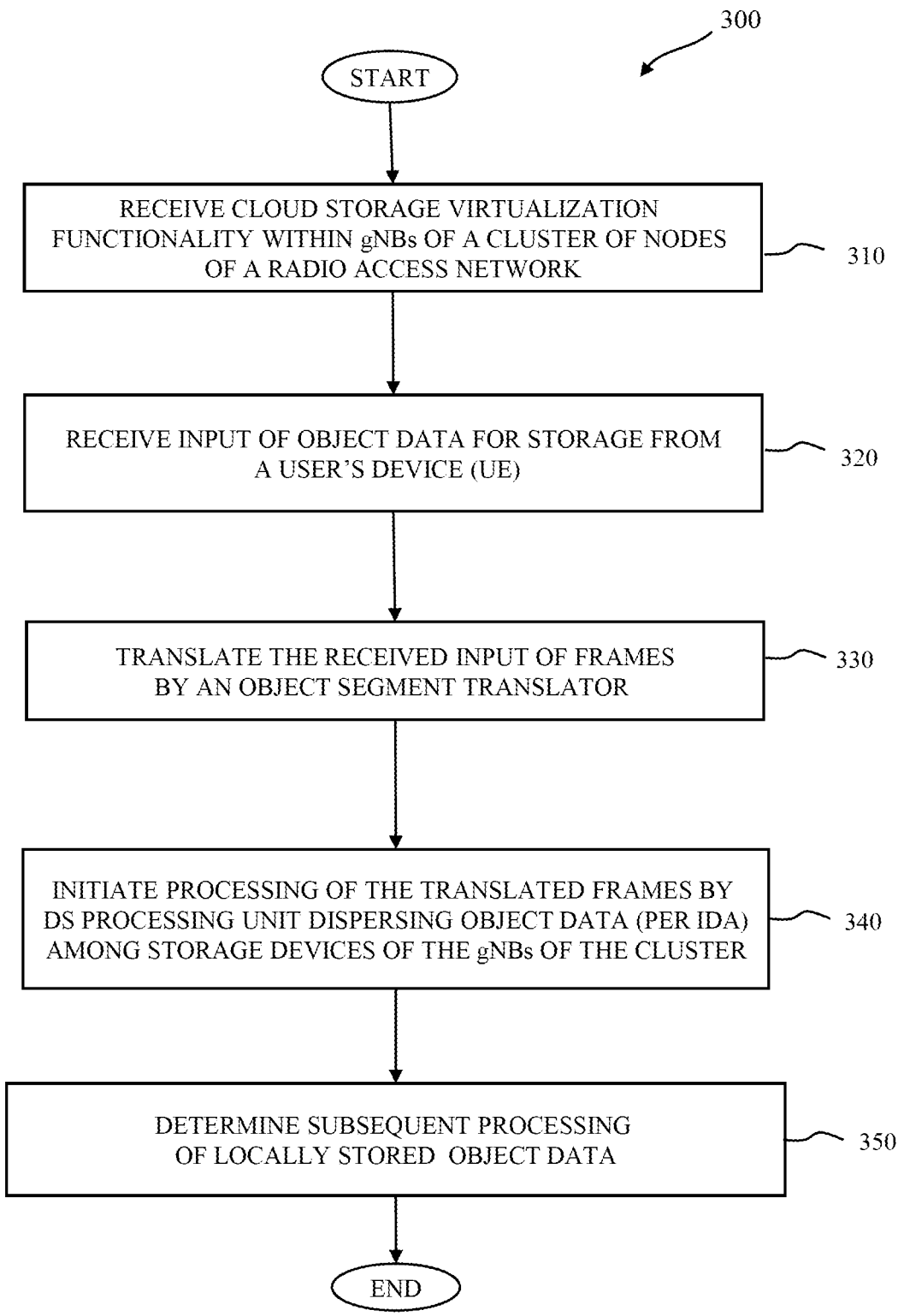
FIG. 3 is a flowchart depicting operational steps of object storage program 300, operating on respective gNB-CU components of gNBs within the distributed data processing environment 100 of FIG. 1.

FIG. 3 is a flowchart depicting operational steps of object storage program 300, operating in on respective gNB-CU components of gNBs within the distributed data processing environment 100 of FIG. 1, in accordance with embodiments of the present invention. Object storage program 300 enables cloud storage virtualization functionality within next generation node B units (gNBs) of a cluster of nodes of a radio access network (step 310). The virtualized network functionality provides computational capabilities that can be co-located with the gNB-CU and can support the slicing of object data into segments and dispersing the segments among the storage devices associated with the gNBs of the RAN cluster.

For example, gNBs of a RAN cluster receive virtualized network function from 5G core cloud sources. The network functionality is included within object storage program 300 and includes a new radio configuration mode, sometimes referred to as a radio personality, to recognize calls from user devices for object storage. The RF signal received from a user device includes code from the new radio personality indicating a request for local object data storage. The virtualized network functionality included in object storage program 300 operates within gNB-CU 210 (FIG. 2), for example, and enables recognition of object storage calls and leverages the split between the centralized unit and the distributed unit of the open radio access network (O-RAN).

Object storage program 300 receives input of object data for storage from a user's device (step 320). A radio frequency call from user equipment (UE) is received by the gNB-DU component of an gNB base transceiver station of a radio access network and includes a new radio configuration mode for local object data storage. The gNB-DU component connects the received input to the gNB-CU unit via an F1 interface. The gNB-CU component supports the PDCP layer and includes object storage program 300, which recognizes the new radio configuration mode for local object storage, based on received virtualized network functionality. The new radio configuration is negotiated during the call setup session, which provides the information for the new mode and resources needed. The PDCP layer provides a transfer service of user plane data, among other services.

For example, UE 170 initiates a radio frequency call to gNB 110b (FIG. 1). The input is received by gNB-DU 160b and is directed to gNB-CU 120b, which has received virtualized network functionality to recognize input requesting cloud object storage on local RAN storage devices. A new radio configuration mode, sometimes referred to as a new radio personality, enables gNB-CU 120b to recognize the request for object storage on local storage devices, and not require backhaul utilization. UE 170 input call can include designation for PUT/GET/DELETE commands for storage configured within the Radio Access Network.

Object storage program 300 translates the received input of object data frames by an object segment translator (step 330). The gNB-CU opens a channel to object storage program 300 to forward the input data. Object storage program 300 receives a new protocol request from Packet Data Coverage Protocol (PDCP) to perform an object segment translation on the received input data. The translation enables the PDCP frames to be processed and dispersed into local storage. The input received is translated into a format that can be processed by an information dispersal algorithm (IDA) performed by the ds processing unit and enables S3 formatted storage of object data on local storage devices embedded or connected to the gNB cluster of the Radio Access Network. In some embodiments, object storage program 300 receives the input, and initiates S3 translation in the PDCP layer that includes an API call. The API call includes certain headers for the PDCP frames making them compatible with IDA processing and S3 storage. In some embodiments, object storage program 300 initiates the IDA algorithm of the ds processing unit to perform the object segmentation translation and other virtualized network functions in the gNB-CU of a next generation node base station (gNB).

For example, having received the object storage input from UE 170, object storage program 300, operating in gNB-CU 120b, performs an S3 translation of the PDCP frames making the data frames compatible with IDA processing and S3 storage formatting.

In some embodiments, object storage program 300, by forwarding a S3 request to the ds processing unit, initiates the IDA of the ds processing unit, which causes redundant dispersal of segment slices of the object data. In some embodiments, object storage program 300 sends a read request to the IDA operations of the ds processing unit, which in turn uses a read threshold to determine the number of the dispersed slices to read to reconstruct the stored data. The IDA defines the read and write thresholds, which in turn determines the dispersal algorithm used by ds processing unit 260. This IDA is pre-configured during the deployment of the storage system of the gNB cluster and can be defined as a factor of the number of gNBs in the gNB cluster.

For example, in an O-RAN dispersed cloud storage system, the IDA operated by the ds processing unit, determines a width and a cluster size of 6 gNBs. Each gNB includes gNB-DU component and gNB-CU component with an embedded ds processing unit and storage device in the respective gNB-CU units. Object storage program 300, initiates the ds processing unit to perform IDA operations for the cluster in which the IDA determines a physical width of 6 and an IDA width of 18, a read threshold of 11 and a write threshold of 14 (18/11/14 segment slices of the object data). In the example, the IDA will store 3 segment slices on each of 6 gNBs of the cluster (i.e., 18 slices) and a minimum of 4 gNBs need to respond to a read request to reconstitute the stored object. The cluster can lose availability of 2 of the 6 gNBs via outages, fading, or channel condition degradation and still successfully respond to the read request.

Object storage program 300 initiates processing of the translated frames by forwarding a S3 request to the ds processing unit, and the ds processing unit, operating with the IDA, disperses the segmented object data among storage devices of the gNBs of the RAN cluster (step 340). A ds processing unit function is an integrated virtualized network function, and the new architecture proposes the tunneling protocol for S3 translated object data (i.e., GTP=GPRS (general packet radio service) Tunneling Protocol; new architecture=GTP Tunnel-S3) to arrive at an endpoint of a virtual ds processing unit application co-located within each gNB-CUs of the RAN cluster. The distributed segments of object data among gNBs of the RAN cluster provide cloud object storage without accessing backhaul operations and storing object data local to the RAN cluster.

In some embodiments, storage devices external to the gNBs receive the segmented slices of object data and communicatively connect to respective centralized units of the gNBs of the cluster. In some embodiments, the object data segments are distributed with redundancy, such that multiple storage devices of the RAN cluster receive copies of the segment slices of object data, which provides safety of data and reliability in reconstruction of object data.

For example, object storage program 300 completes S3 translation of the object data by S3 translator 250 and the translated data is processed by IDA 255 to determine the number of slices required to store the data. The translated data is tunneled to an end point at an application of ds processing unit 260 that slices the object data into segments according to the processing of the IDA, and object storage program 300 initiates the ds processing unit to distribute the slices among the storage devices, such as storage device 265 embedded within the gNB-CU 210 of a gNBs of the RAN cluster. Each object data segment is distributed to a storage device of a particular gNB of the cluster, and each storage device may receive multiple slices of the translated object data, based on the size of the object data and the redundancy included in segment distribution.

Object storage program 300 determines the subsequent processing of locally stored object data (step 350). In some embodiments, object storage program 300 receives and enforces policies regarding storage of object data in RAN storage devices. Policies may support temporary or permanent storage of object data within the gNB cluster. Policies may include time limitation of local storage followed by automatic deletion, scheduling of uploading the locally stored object data to cloud storage during low-demand periods, followed by deletion of data at the local storage devices, and may include indefinite retention of object data at the local storage devices. In some embodiments, policies may be in place to replicate data to a cloud system or pull/get data from the cloud system. In some embodiments S3 storage criteria and policies may be applied to the translated and locally stored object data, for example, criteria for a duration of storage. By use of redundant dispersal, object storage program 300 and the storage enabled RAN cluster provide safety for regeneration of data, and object storage security benefits at the RAN layer. Malicious attackers would have to hack a minimum number threshold of gNB storage devices to successfully access decipherable data, providing cyber security protection.

Figure 4:
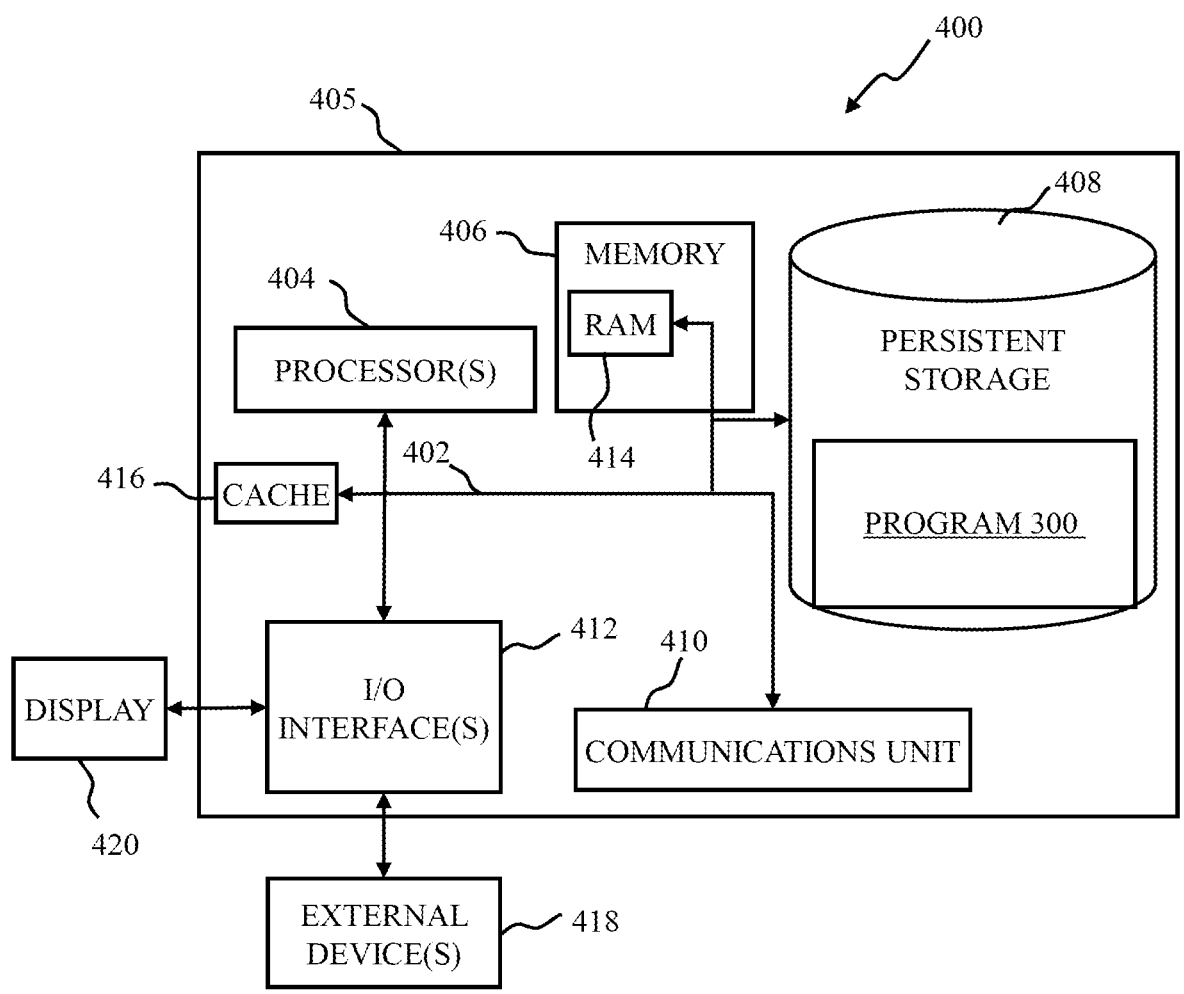
FIG. 4 depicts a block diagram of components of a computing system, including a computing device configured to operationally perform the object storage program of FIG. 3, in accordance with an embodiment of the present invention.

FIG. 4 depicts a block diagram of components of a computing system 400, including computing device 405, configured to include or operationally connect to components similar to those included in gNB-Centralized Units, and with the capability to operationally perform object storage program 300 of FIG. 3, in accordance with an embodiment of the present invention.

Computing device 405 includes components and functional capability similar to components of computing device 110 and customer computing device 120, (FIG. 1), in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, an input/output (I/O) interface(s) 412. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406, cache memory 416, and persistent storage 408 are computer-readable storage media. In this embodiment, memory 406 includes random access memory (RAM) 414. In general, memory 406 can include any suitable volatile or non-volatile computer-readable storage media.

In one embodiment, object storage program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Object storage program 300 may be downloaded to persistent storage 308 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., object storage program 300 can be stored on such portable computer-readable storage media and can be loaded onto persistent storage 408 via I/O interface(s) 412. I/O interface(s) 412 also connects to a display 420.

Display 420 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of dispersed object storage within a radio access network (RAN), the method comprising:
    one or more processors receiving radio frequency (RF) input for object data storage from a client device;
    the one or more processors performing a setup session configuring the RF input received for the object data storage;
    the one or more processors performing a translation of the RF input received, wherein the translation converts the RF input to an S3 object storage format, which is fed into a distributed storage (DS) processing unit, initiating an information dispersal algorithm (IDA);
    the one or more processors dispersing segments of the input in the S3 object storage format among multiple next generation node base stations (gNBs) forming a gNB cluster within a radio access network (RAN); and
    the one or more processors storing the object data of the received RF input segmented across the gNB cluster in an S3 object storage format.

2. The method of claim 1, wherein the translation is an object segment translation performed at a Packet Data Coverage Protocol (PDCP) layer of an upper stack and includes formatting translated PDCP frames for S3 storage.

3. The method of claim 1, wherein the number of storage devices in a gNB cluster is a function of the number of gNB nodes in the gNB cluster.

4. The method of claim 1, wherein the RF input is recognized as a new radio configuration requesting object data storage on local storage devices within the RAN.

5. The method of claim 1, wherein a radio personality defined by the user device during session setup provides a trigger for initiating the PDCP layer to transmit received RF data for translation to S3 storage format.

6. The method of claim 1, wherein a duration of storage of the object data within the RAN and subsequent actions taken on the object data stored within the RAN are based on radio personality policies determined by the user terminal at the time of session setup.

7. The method of claim 1, wherein the DS processing unit is included as a component of gNBs of the cluster, redundant copies of each segment slice of translated RF input object data are dispersed to a multiple of gNBs of the cluster within the RAN, and wherein the DS processing unit operates an IDA that determines a size and a number of segment slices for the object data storage.

8. The method of claim 1, further comprising:
    the one or more processors communicating with gNBs of the cluster by interfaces providing connections that enable the dispersal of slices of translated RF input object data to storage devices included in gNB control units of the cluster.

9. A computer system for dispersed object storage within a radio access network (RAN), the computer system comprising:
    one or more computer processors;
    one or more computer readable storage media and program instructions stored on the one or more computer readable storage media, the program instructions comprising:

program instructions to receive radio frequency (RF) input for object data storage from a client device;

program instructions to perform a setup session configuring the RF input received for the object data storage;

program instructions to perform a translation of the RF input received, wherein the translation converts the RF input to an S3 object storage format, which is fed into an DS processing unit, initiating an information dispersal algorithm (IDA);

program instructions to disperse segments of the input in the S3 object storage format among multiple next generation node base stations (gNBs) forming a gNB cluster within a radio access network (RAN); and program instructions to store the object data of the received RF input segmented across the gNB cluster in an S3 object storage format.

10. The computer system of claim 9, wherein the translation is an object segment translation performed at a Packet Data Coverage Protocol (PDCP) layer of an upper stack and includes formatting translated PDCP frames for S3 storage.

11. The computer system of claim 9, wherein a radio personality defined by the user device during session setup provides a trigger for initiating the PDCP layer to transmit received RF data for translation to S3 storage format.

12. The computer system of claim 9, wherein the RF input is recognized as a new radio configuration requesting object data storage on local storage devices within the RAN.

13. The computer system of claim 9, wherein a duration of storage of the object data within the RAN and subsequent actions taken on the object data stored within the RAN are based on radio personality policies determined by the user terminal at the time of setup.

14. The computer system of claim 9, wherein the DS processing unit is included as a component of gNBs of the cluster, redundant copies of each segment slice of translated RF input object data are dispersed to a multiple of gNBs of the cluster within the RAN.

15. The computer system of claim 9, further comprising:
program instructions to communicate with gNBs of the cluster by interfaces providing connections that enable the dispersal of slices of translated RF input object data to storage devices included in gNB control units of the cluster.

16. A computer program product for dispersed object storage within a radio access network (RAN), the computer program product comprising:
at least one computer readable storage medium and program instructions stored on the at least one computer readable storage medium, the program instructions comprising:
program instructions to receive radio frequency (RF) input for object data storage from a client device;
program instructions to perform a setup session configuring the RF input received for the object data storage;
program instructions to perform a translation of the RF input received, wherein the translation converts the RF input to an S3 object storage format, which is fed into an DS processing unit, initiating an information dispersal algorithm (IDA);
program instructions to disperse segments of the input in the S3 object storage format among multiple next generation node base stations (gNBs) forming a gNB cluster within a radio access network (RAN); and
program instructions to store the object data of the received RF input segmented across the gNB cluster in an S3 object storage format.

17. The computer program product of claim 15, wherein the translation is an object segment translation performed at a Packet Data Coverage Protocol (PDCP) layer of an upper stack and includes formatting translated PDCP frames for S3 storage.

18. The computer program product of claim 15, wherein the RF input is recognized as a new radio configuration requesting object data storage on local storage devices within the RAN.

19. The computer program product of claim 15, wherein a duration of storage of the object data within the RAN and subsequent actions taken on the object data stored within the RAN are based on radio personality policies determined by the user terminal at the time of session setup.

20. The computer program product of claim 15, further comprising:
program instructions to communicate with gNBs of the cluster by interfaces providing connections that enable the dispersal of slices of translated RF input object data to storage devices included in gNB control units of the cluster.

* * * * *